United States Patent
Hiei

(10) Patent No.: US 7,137,899 B2
(45) Date of Patent: Nov. 21, 2006

(54) FACILITY MANAGEMENT SUPPORT APPARATUS, METHOD, AND MEDIUM FOR SUPPORTING MANAGEMENT OF VISITORS IN FACILITY AREA

(75) Inventor: Hajime Hiei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 10/106,413

(22) Filed: Mar. 26, 2002

(65) Prior Publication Data

US 2003/0114233 A1 Jun. 19, 2003

(30) Foreign Application Priority Data

Dec. 19, 2001 (JP) ............................. 2001-385793

(51) Int. Cl.
A63J 3/00 (2006.01)
E04H 3/10 (2006.01)
E01C 13/00 (2006.01)

(52) U.S. Cl. .................. 472/92; 472/136; 434/365; 702/150; 705/5; 382/100

(58) Field of Classification Search ............... 434/107, 434/219, 307 R, 365, 433; 472/136, 92; 707/104.1; 709/202, 217; 340/323 R; 715/700; 702/150; 382/100; 725/35; 705/8; 345/782; 244/158.4; 348/239; 700/19; 455/3.02
See application file for complete search history.

(56) References Cited

U.S. PATENT DOCUMENTS

| | | | | |
|---|---|---|---|---|
| 5,523,737 A | * | 6/1996 | Luna | 340/323 R |
| 5,566,327 A | * | 10/1996 | Sehr | 707/104.1 |
| 5,929,848 A | * | 7/1999 | Albukerk et al. | 715/700 |
| 6,078,928 A | * | 6/2000 | Schnase et al. | 707/104.1 |
| 6,695,259 B1 | * | 2/2004 | Maeda et al. | 244/158.4 |
| 6,889,098 B1 | * | 5/2005 | Laval et al. | 700/19 |
| 6,925,284 B1 | * | 8/2005 | Asami | 455/3.02 |
| 6,938,066 B1 | * | 8/2005 | Doi | 709/202 |
| 2002/0026289 A1 | * | 2/2002 | Kuzunuki et al. | 702/150 |
| 2002/0168084 A1 | * | 11/2002 | Trajkovic et al. | 382/100 |
| 2002/0170056 A1 | * | 11/2002 | Akiyama et al. | 725/35 |
| 2002/0174003 A1 | * | 11/2002 | Redmann et al. | 705/8 |
| 2003/0061303 A1 | * | 3/2003 | Brown et al. | 709/217 |
| 2003/0090523 A1 | * | 5/2003 | Hayashi et al. | 345/782 |
| 2004/0239776 A1 | * | 12/2004 | Shinohara et al. | 348/239 |

FOREIGN PATENT DOCUMENTS

| | | | | |
|---|---|---|---|---|
| JP | | 2002117178 A | * | 4/2002 |
| JP | | 2003058922 A | * | 2/2003 |

* cited by examiner

Primary Examiner—Joe H. Cheng
(74) Attorney, Agent, or Firm—Greer, Burns & Crain, Ltd.

(57) ABSTRACT

There is provided a facility management support apparatus which manages visitors in a facility area, the apparatus includes: a place information storage unit for storing the degree of crowdedness in each of the places in the facility area; a receiving unit for receiving, from a terminal, information which enables identification of the location of the terminal; an extraction unit for extracting one of the places to which one of the visitors should move on the basis of the degree of crowdedness and the location of the terminal; and a transmission unit for transmitting, to the terminal, information which enables identification of the place to which the visitor should move.

6 Claims, 16 Drawing Sheets

*FIG. 10*

| POINT NAME | RANK | DEGREE OF CROWDEDNESS |
|:---:|:---:|:---:|
| GOAL | 0 | 2 |
| A1 | 3 | 7 |
| A2 | 2 | 6 |
| B1 | 4 | 8 |
| B2 | 1 | 5 |
| ⋮ | ⋮ | ⋮ |

FIG. 11

| PRESENT POINT | PLAYER ATTRIBUTES | | SELECTABLE POINTS |
|---|---|---|---|
| | NUMBER OF PERSONS | ATTRIBUTE | |
| TICKET ISSUE | 2 | COUPLE | A1, A2 |
| TICKET ISSUE | 1 | COUPLE | A1, A2 |
| TICKET ISSUE | 2 | FAMILY | A1, A2 |
| ⋮ | ⋮ | ⋮ | ⋮ |
| A1 | 2 | COUPLE | B1, B2 |
| A1 | 4 | FAMILY | B1, B2 |
| ⋮ | ⋮ | ⋮ | ⋮ |
| A2 | 2 | COUPLE | B1, B2 |
| A2 | 4 | FAMILY | B1, B2 |
| ⋮ | ⋮ | ⋮ | ⋮ |
| B1 | 2 | COUPLE | GOAL |
| B1 | 4 | FAMILY | GOAL |
| ⋮ | ⋮ | ⋮ | ⋮ |
| B2 | 2 | COUPLE | GOAL |
| B2 | 4 | FAMILY | GOAL |
| ⋮ | ⋮ | ⋮ | ⋮ |
| GOAL | | | |

FIG. 12

| PARTICIPANT ID | PLAYER ATTRIBUTES | | | | NEXT POINT |
|---|---|---|---|---|---|
| | STORY | NUMBER OF PERSONS | ATTRIBUTE | PASSED POINT RECORD | |
| 0000001 | ORIENTEERING | 2 | COUPLE | A2 | B1 |
| 0000002 | TOM'S ADVENTURE | 4 | FAMILY | C1, C2 | B3 |
| ... | ... | ... | ... | ... | ... |
| 9999999 | ORIENTEERING | 3 | FEMALE GROUP | B1, A2 | B3 |

FIG. 14

| POINT NAME | RANK | DEGREE OF CROWDEDNESS | TOPIC PLACE FACTOR | DEGREE OF CROWDEDNESS -TOPIC PLACE FACTOR GOAL |
|---|---|---|---|---|
| GOAL | 0 | 2 | | 2 |
| A1 | 3 | 7 | 3 | 4 |
| A2 | 2 | 6 | | 6 |
| B1 | 4 | 8 | | 8 |
| B2 | 1 | 5 | | 5 |
| ------ | ------ | ------ | | ------ |

FIG. 16

| PARTICIPANT ID | STORY | NUMBER OF PERSONS | ATTRIBUTE | PASSED POINT RECORD | WISH |
|---|---|---|---|---|---|
| 123 | ORIENTEERING | 2 | COUPLE | A1、A2 B2 | B2、D3 |
| 456 | TOM'S ADVENTURE | 4 | FAMILY | C1、C2 | D5 |
| ⋮ | ⋮ | ⋮ | ⋮ | ⋮ | ⋮ |

FIG. 17

| PRESENT POINT | NAME | STORY | SELECTABLE POINT | DEGREE OF CROWDEDNESS |
|---|---|---|---|---|
| A1 | MERRY-GO-ROUND | ORIENTEERING | A1, A2 | 10 |
| A2 | HAUNTED HOUSE | ORIENTEERING | B1, B2 | 5 |
| D2 | SOUVENIR STORE | ALL | NONE | 5 |
| ⋮ | ⋮ | ⋮ | ⋮ | ⋮ |

FACILITY MANAGEMENT SUPPORT APPARATUS, METHOD, AND MEDIUM FOR SUPPORTING MANAGEMENT OF VISITORS IN FACILITY AREA

BACKGROUND OF THE INVENTION

1. Field of the Invention

The present invention relates to a technique for providing attractions including a game in a facility area such as a theme park.

2. Description of the Related Art

Today, a multiplicity of facilities such as theme parks and amusement parks are established to offer services with various amusement machines and installations, services in restaurants, shops, etc., and attractions such as shows and parades.

Conventionally, in such facilities, amusement machines, installations, shops, attractions, etc., which provide services are independently managed. Therefore, there is a possibility of each place in a facility area being crowded or uncrowded depending on the popularity of an amusement machine, an installation, a shop, an attraction, or the like. For this reason, in some cases, it is difficult to perform service operations with efficiency by effectively using places, installations, shops, etc., in a facility area.

The method of restricting access or admission to an installation or an attraction to mitigate the degree of crowdedness in each place in such a situation has been practiced. Such a measure may displease visitors, reduce visitor's interest in installations and attractions, and cause a reduction in revisit rate to the facility area.

SUMMARY OF THE INVENTION

In view of the above-described problem of the conventional art, an object of the present invention is to provide an apparatus and method for controlling flows of visitors in a facility area such as a theme park or an amusement park while keeping visitors interested in installations and attractions.

To achieve the above-described object, according to one aspect of the present invention, there is provided a facility management support apparatus which manages visitors in a facility area, comprising:

place information storage unit storing the degree of crowdedness in each of places in the facility area;

receiving unit receiving, from a terminal, information which enables identification of the location of the terminal;

extraction unit extracting one of the places to which one of the visitors should move on the basis of the degree of crowdedness and the location of the terminal; and transmission unit transmitting, to the terminal, information which enables identification of the place to which the visitor should move.

The facility area is, for example, an amusement park or a theme park which attracts a multiplicity of persons. A play involving movement in the facility area may be performed. The play may be a game including making a tour of the facility area, e.g., orienteering or an exploratory game. It is possible to smoothly control flows of people by guiding each of participants in such a game with the advancement of the game without causing the participants to have a feeling of restraint or uncomfortableness.

Preferably, the above-described facility management support apparatus further has visitor information storage unit for storing information on a record of movements of the visitor; the receiving unit also receives information which enables identification of the visitor; and the extraction unit newly extracts a different one of the places to which the visitor should move if it is determined on the basis of the visitor information storage unit that the former extracted place to which the visitor should move coincides with one of the places to which the visitor has already moved. Thus, the facility management support apparatus operates so as to prevent one visitor to the facility area from moving to the same place frequently.

Preferably, the above-described facility management support apparatus may further comprise visitor information storage unit for storing information on one of the places to which the visitor wishes to move, in which; the receiving unit also receives information which enables identification of the visitor; and the extraction unit extracts, on the basis of the visitor information storage unit, one of the places to which the visitor wishes to move.

Preferably, the above-described facility management support apparatus may further comprise story storage unit for storing information on the places and a story by relating the places and the story to each other, in which the extraction unit extracts one of the places to which the visitor should move on the basis of the location of the terminal and the story.

Preferably, the story may be selected on the basis of story selection information received from the visitor in advance.

The above-described arrangement enables each visitor to select a story, and the facility management support apparatus can guide the visitor in moving to the places relating to the story.

Preferably, the degree of crowdedness may be computed on the basis of information which enables identification of the location of the terminal.

Any one of the above-described components of the present invention may be realized as a program which runs on a computer. The present invention may also comprise a method of making a computer execute any of the above-described processings. The present invention may also comprise a program for realizing any one of the above-described functions by means of a computer. The present invention may further comprise a computer readable recording medium on which such a program is recorded.

As described above, the present invention makes it possible to control flows of visitors in a facility area such as a theme park or an amusement park while keeping visitors interested in installations and attractions.

BRIEF DESCRIPTION OF THE DRAWINGS

In the accompanying drawings:

FIG. 10 is a diagram showing an example of data in control file 6 in a second embodiment of the present invention;

FIG. 11 is a diagram showing an example of data in next point file 5 in the second embodiment;

FIG. 12 is a diagram showing an example of data in participant file 4 in the second embodiment;

FIG. 14 is a diagram showing a modification of control file 6;

FIG. 16 is a diagram showing a modification of participant file 4; and

FIG. 17 is a diagram showing a modification of the next point file 5.

DESCRIPTION OF THE PREFERRED EMBODIMENTS

Preferred embodiments of the present invention will be described with reference to the accompanying drawings.

First Embodiment

Figure 1:
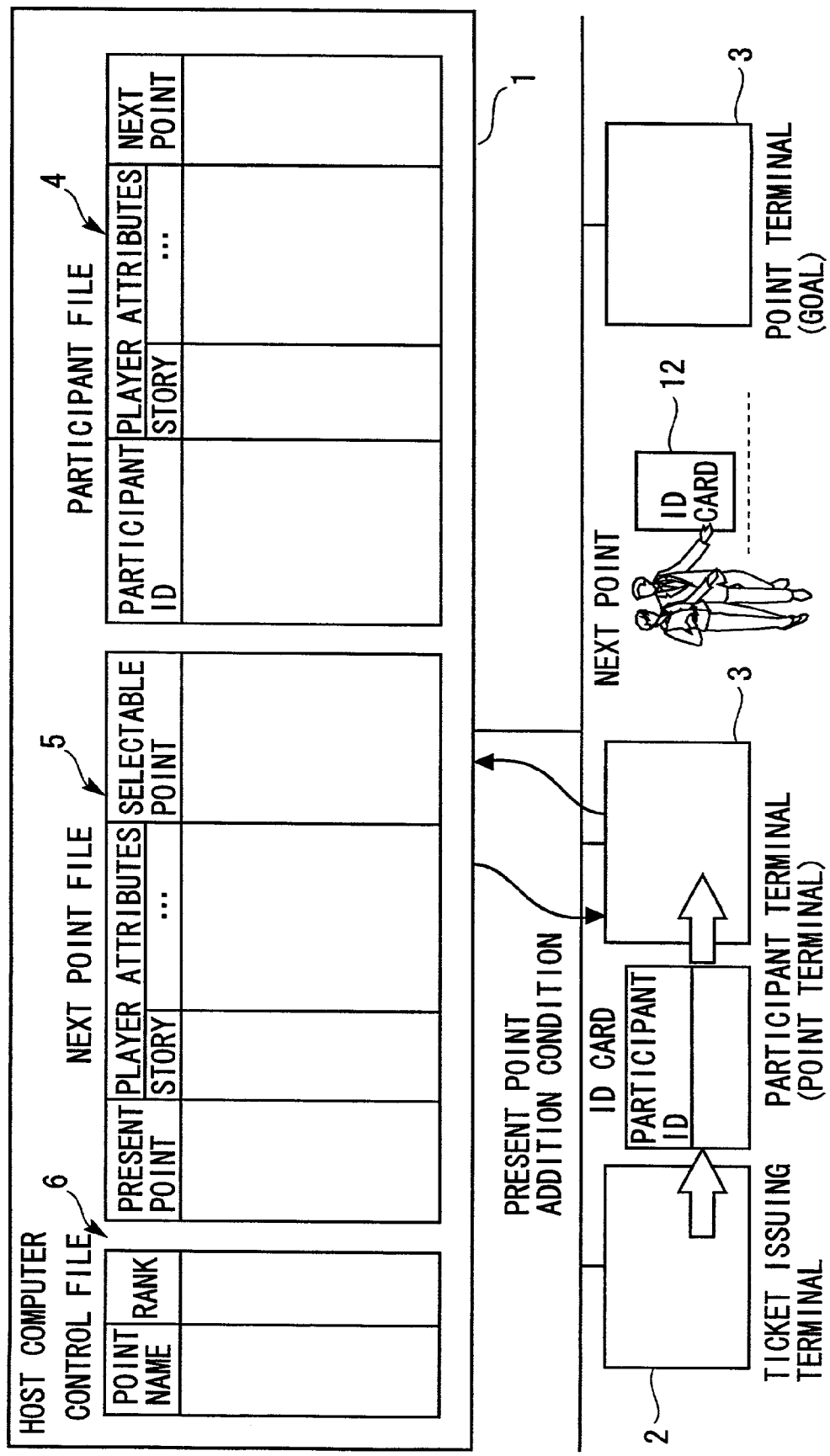
FIG. 1 is a diagram showing the principle of an information system in a first embodiment of the present invention.
Figure 2:
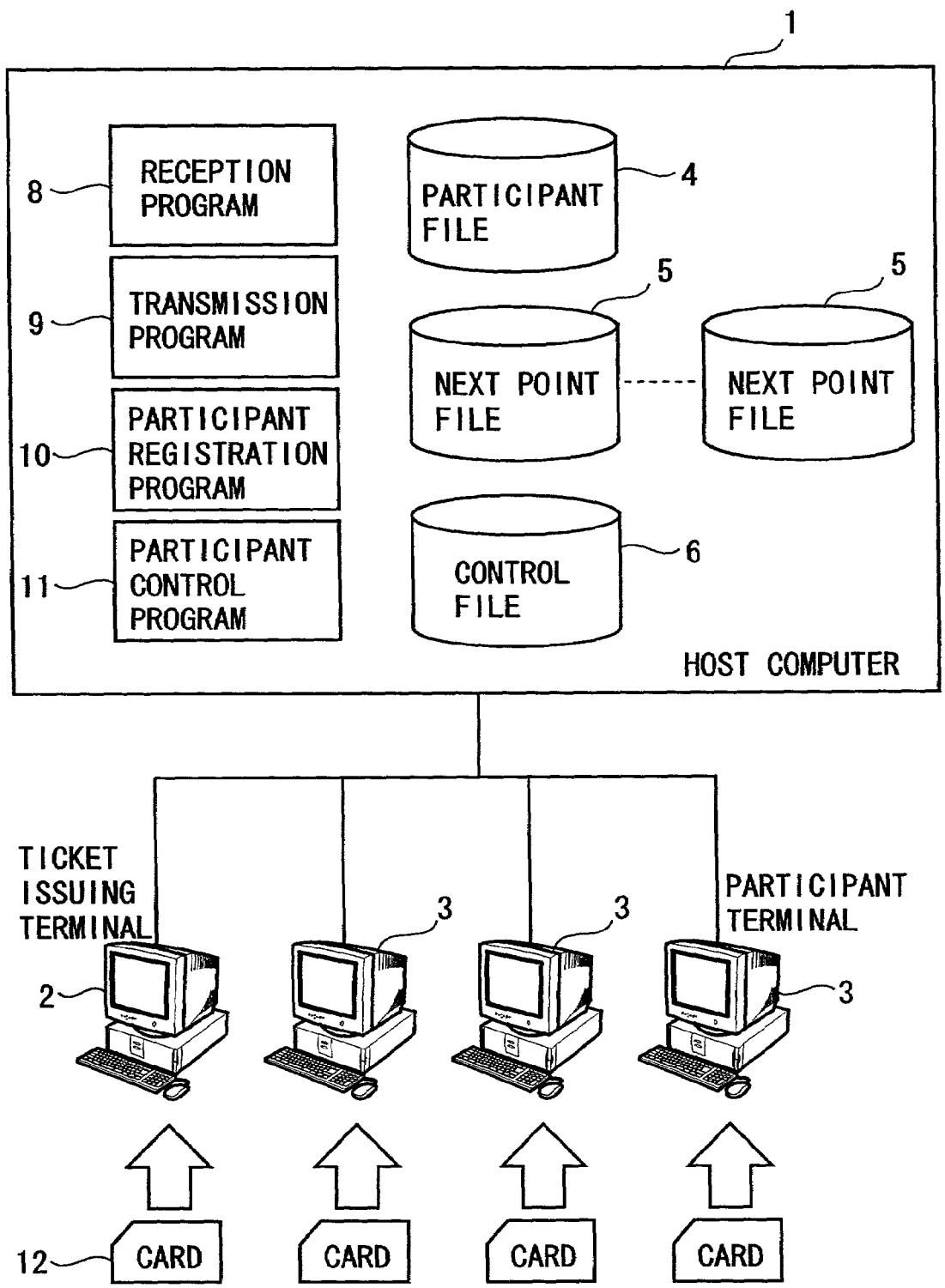
FIG. 2 is a diagram showing the configuration of the information system.
Figure 3:
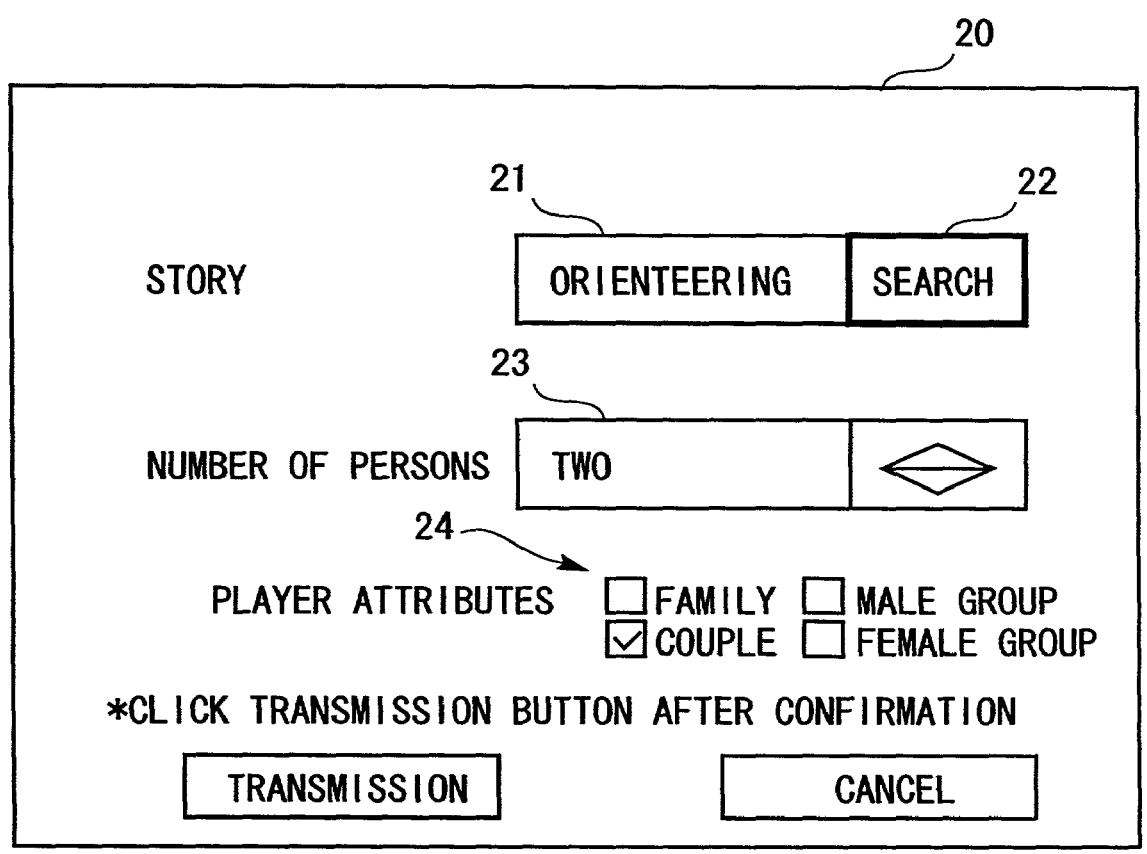
FIG. 3 is a diagram showing an example of a participant attribute input window 20.
Figure 4:
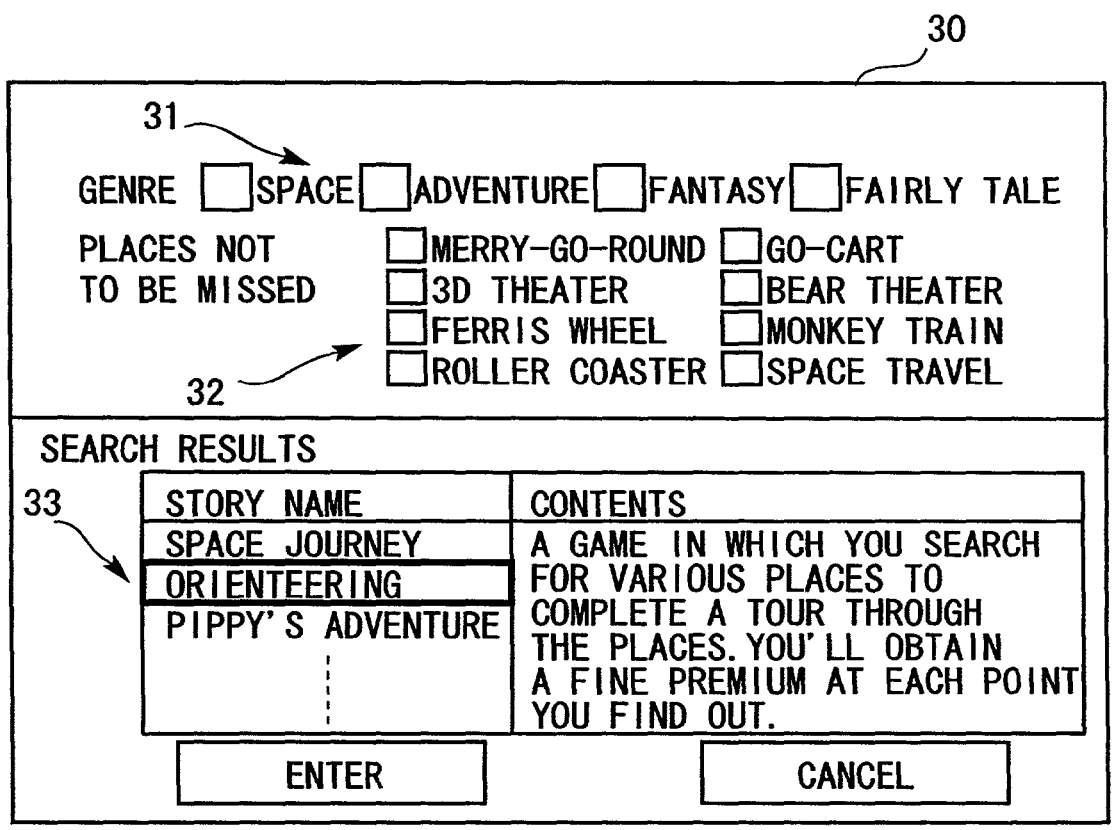
FIG. 4 is a diagram showing an example of a story search window 30.
Figure 5:
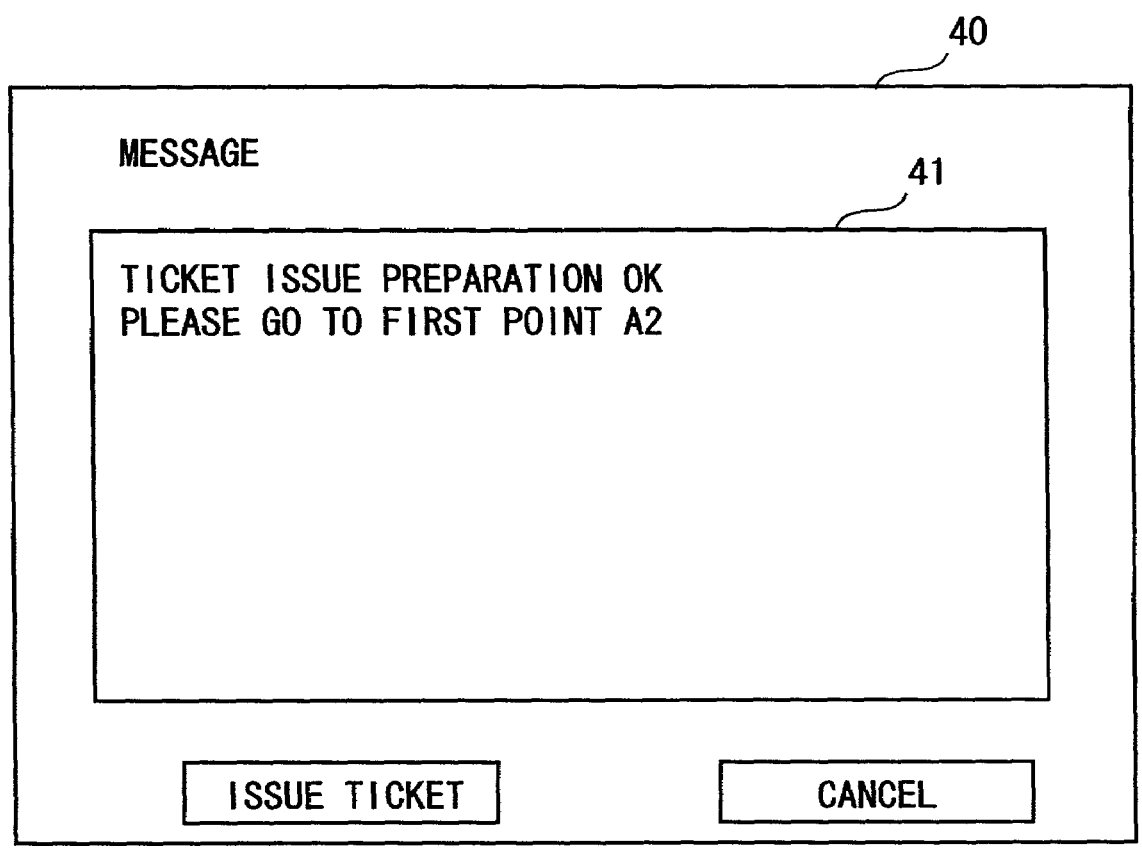
FIG. 5 is a diagram showing an example of a ticket issue window 40.
Figure 6:
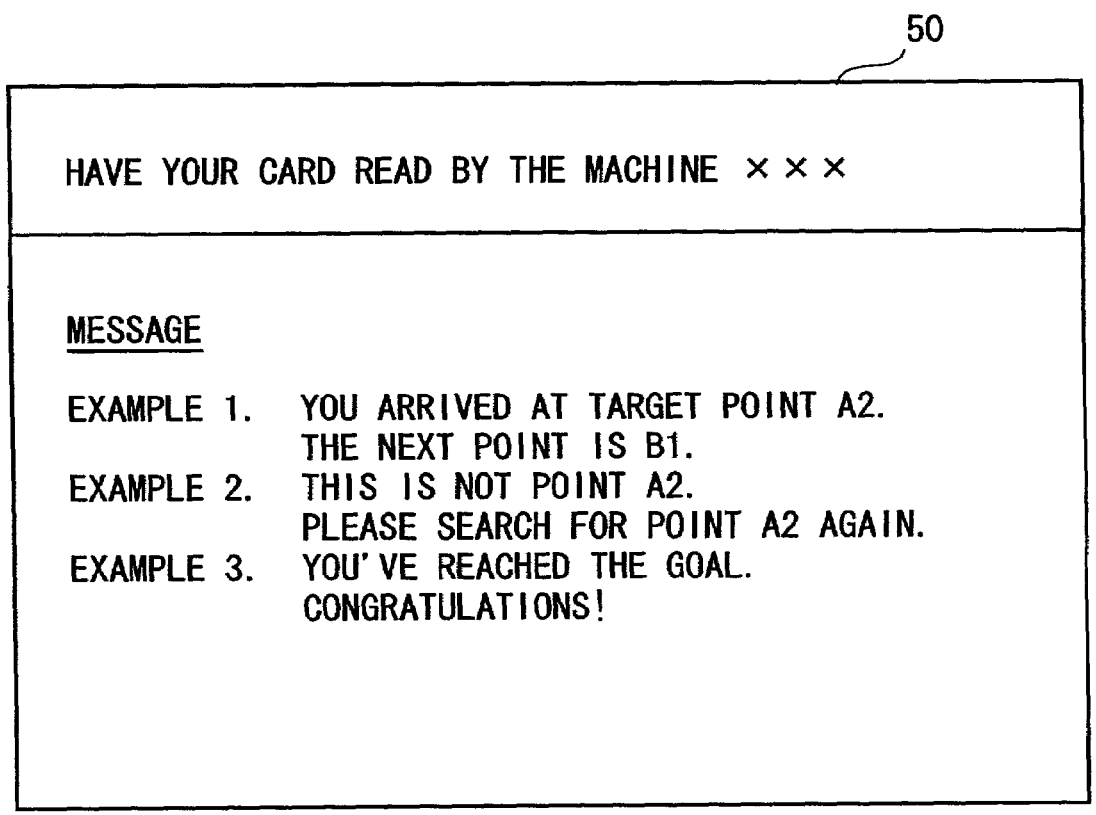
FIG. 6 is a diagram showing an example of a window 50 displayed on a participant terminal 3.
Figure 7:
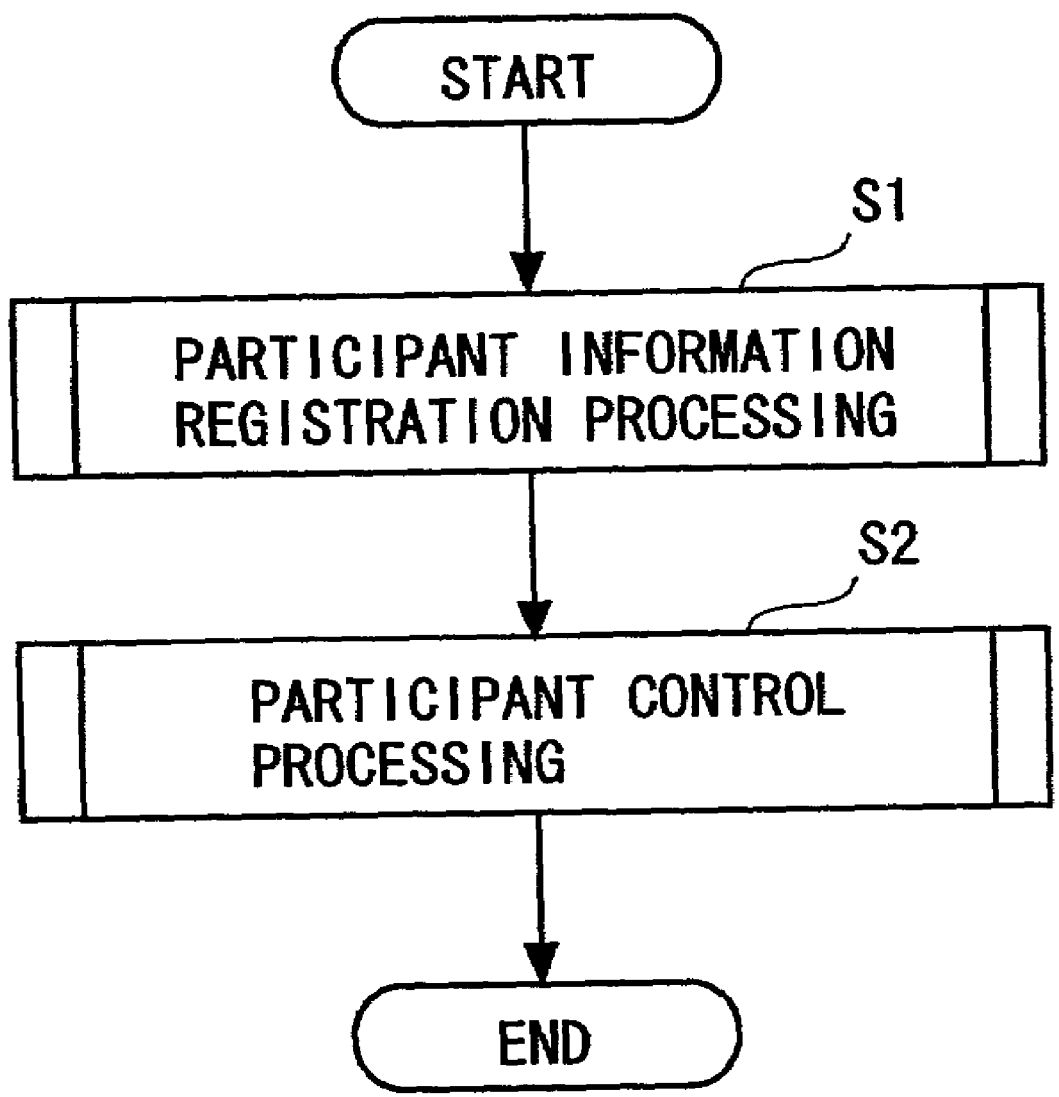
FIG. 7 is a flowchart showing processing in the information system.
Figure 8:
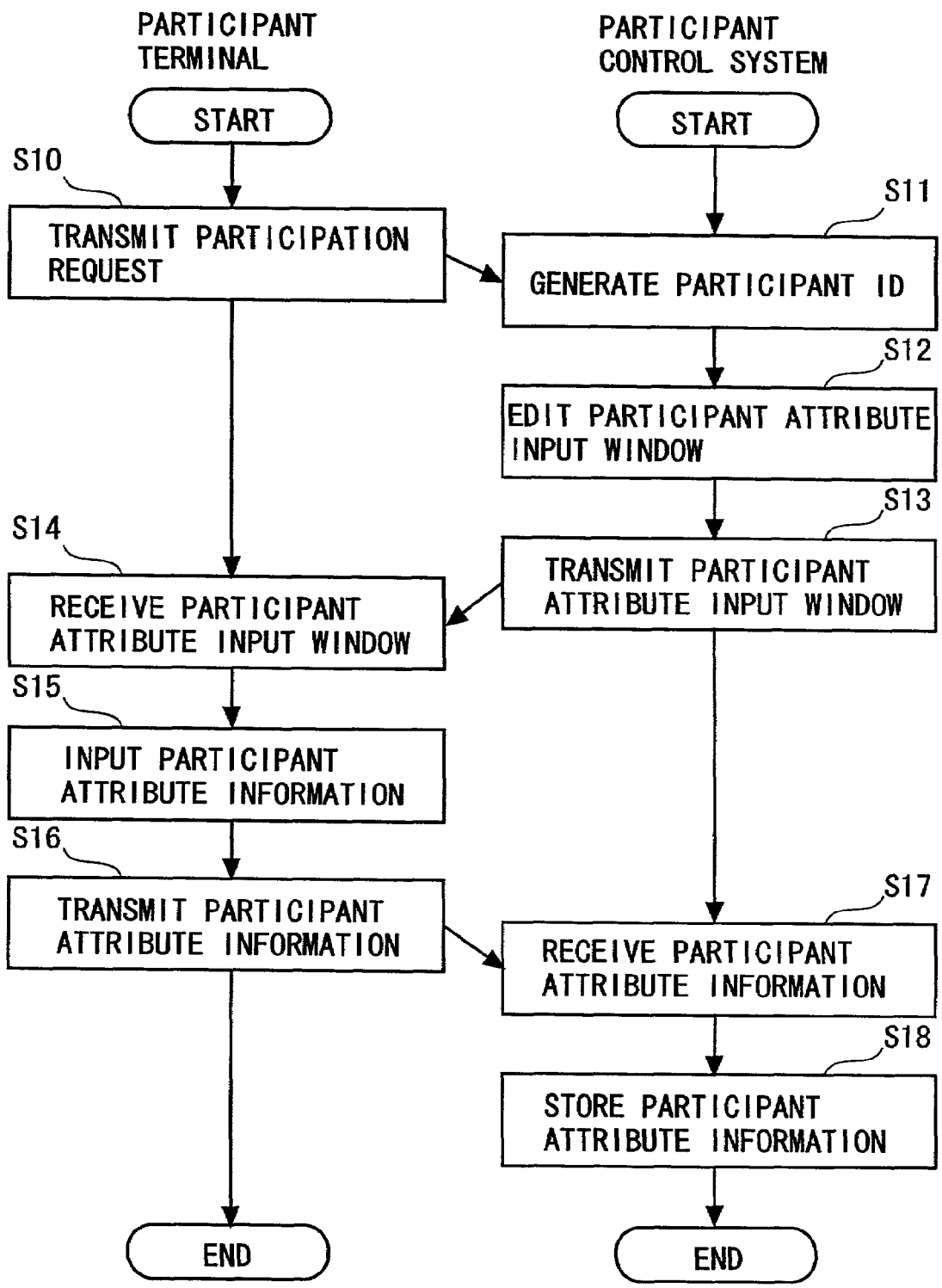
FIG. 8 is a flowchart showing details of participant information registration processing (S1)
Figure 9:
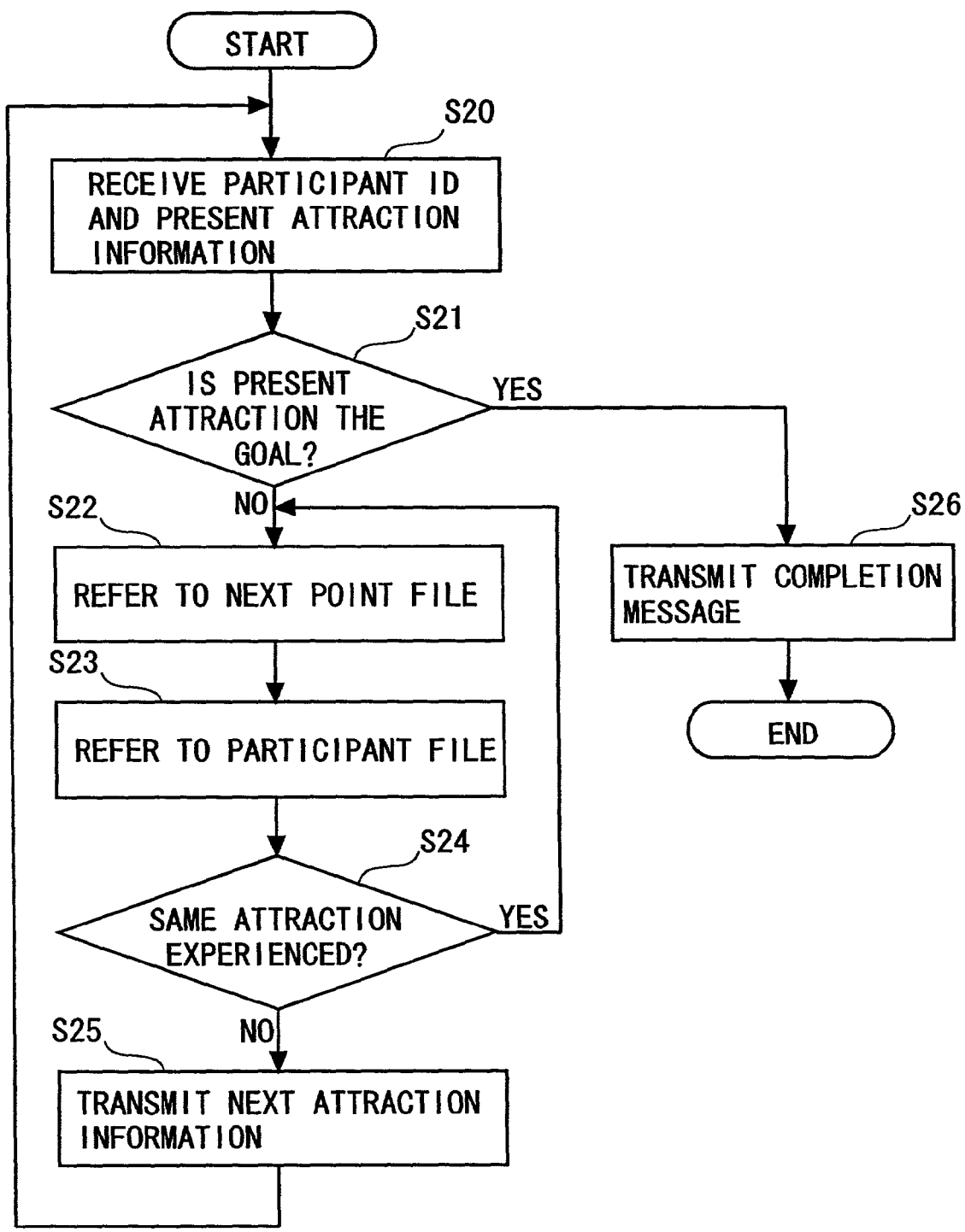
FIG. 9 a flowchart showing details of participant control processing (S2)

A first embodiment of the present invention will be described with reference to FIGS. 1 through 9. FIG. 1 shows the principle of an information system in accordance with the first embodiment of the present invention. FIG. 2 is a diagram showing the configuration of the information system. FIG. 3 is a diagram showing an example of a participant attribute input window 20 through which information on participants is input at a ticket issuing terminal 2 shown in FIG. 2. FIG. 4 shows an example of a story search window 30 which is displayed when a search button 22 shown in FIG. 3 is clicked. FIG. 5 shows an example of a ticket issue window 40 which is displayed when input of participant attributes through the participant attribute input window 20 shown in FIG. 3 is completed. FIG. 6 shows an example of a window 50 displayed on a participant terminal 3 shown in FIG. 2. FIG. 7 is a flowchart showing processing in the present information system. FIG. 8 is a flowchart showing details of participant information registration processing (S1) shown in FIG. 7. FIG. 9 a flowchart showing details of participant control processing (S2) shown in FIG. 7.

<Principle of Information System>

FIG. 1 shows the principle of the present information system. The information system supports a game executed in a facility area such as a theme park or an amusement park by inviting a plurality of persons to participate in the game. In this specification, "game" refers to any of kinds of game including a competition and a play performed by a plurality of participants in a facility area, e.g., orienteering and a game requiring exploration of the facility area.

In this embodiment, a procedure including steps described below, which are performed by participants for the purpose of making the rounds of attractions in which he or she wishes to participate with efficiency, and which are effective in mitigating crowdedness of the entire facility area, also falls under the category of "game".

(1) At a start of a game, a participant selects an attraction in which he or she wishes to participate.

(2) The system designates, as an attraction in which the participant will next participate, one of the most uncrowded attractions except ones in which the participant has already participated.

A process in which a participant makes the rounds of respective attractions with some intention is regarded as a game in this embodiment. Also, a game itself or contents of a game is called a story in this embodiment.

As shown in FIG. 1, the present information system is constituted of a host computer 1, a ticket issuing terminal 2 connected to the host computer 1 through a network, and participant terminals 3 installed in certain places in a facility area and also connected to the host computer through the network.

The ticket issuing terminal 2 registers participants in a game in the information system, and gives participant IDs to the participants. The given participant IDs are written to ID cards 12 distributed to the respective participants. When one participant ID is issued, the participant given the participant ID participates in the game (the game for the participant is started).

Participant terminals 3 are provided in a plurality of places in the facility area. When the game is started, the ticket issuing terminal 2 designates a place to which each participant should move next. When the participant moves to the next point, he or she inputs the participant ID from the ID card 12 to the participant terminal 3 installed in the place.

The participant terminal 3 then informs the host computer 1 of the participant ID and the place. In response to this information, the host computer 1 indicates on the participant terminal 3 the next place to go. The participant moves to the next place by referring to the indication on the participant terminal 3.

The host computer 1 advances the game by repeating instructing each participant to move, receiving the participant ID from the participant terminal 3 after movement of the participant to the terminal, and instructing the participant to move to the next place. When the participant ID is input to the participant terminal 3 installed at a goal point, the host computer 1 terminates the game for the participant.

In this embodiment, the participant terminal 3 is also referred to as a point terminal in the sense that it controls the move to each place (point). It is not necessary to discriminate the ticket issuing terminal 2 and each participant terminal 3 from each other by recognizing them as different components. One terminal may be used both as the ticket issuing terminal 2 and as the participant terminal 3.

The host computer 1 has a control file 6, a next point file 5, and a participant file 4 for such game execution support.

The control file 6 is a file for determining the priority ranks of places one of which is selected with priority over some of the others as a place to which a game participant should move next. Each unit data in the control file 6 includes an item in a "point name" field and an item in a "rank" field (A priority rank may be called as rank simply in the embodiment).

Each data item in the "point name" field represents a name for identification of one of the places. The corresponding data item in the "rank" field represents the priority rank of the place. Higher the rank, higher the priority with which a move to the corresponding place is designated. In the control file 6, priority ranks are set in combination with point names, which ranks are to be referred to in designating a move of a participant to one of the places. For example, in a case where there are candidate places A and B to one of which a participant should move next, and where the rank of place A is set higher than that of place B in the control file 6, the next place to which the participant should move next is place A.

The next point file 5 is a file for defining candidates for the next place to go from the present location of each participant. Each unit data in the next point file 5 includes an item in a "present point" field, an item in a "player attributes" field, and an item in a "selectable point" field.

Each data item in the "present point" field represents the place from which a move to the next place to go is made, i.e., the place corresponding to the present location of one participant. The corresponding data item in the "player attributes" field is information for specifying attributes of the participant. Candidates for the next place to go are selected according to the combination of the present point and player attributes of the participant.

Player attributes are separated with respect to stories. A story denotes a kind of game. For example, orienteering data is set with respect to a game (story) "orienteering".

Further, player attributes include, for example, the number of persons in a participant group, attributes of the group (a couple, a family, a female group, etc.), and a record of points passed through (a record of places which have already been passed through in the present game). A record of points passed through in a plurality of games (e.g., in one day) may also be recorded as player attributes.

As data in the "selectable point" field, one or more next-place candidates selectable with respect to the attributes of each of the participants (players) at the present point are held. Thus, one or more candidates for the place to which each participant in each place should move next are selected by using the next point file 5.

The participant file 4 holds player attributes of each participant and the place to which the participant should move next. That is, each unit data in the participant file 4 includes an item in a "participant ID" field, an item in a "player attributes" field, and an item in a "next point" field.

Each data item in the "participant ID" field is information for identification of one participant. The corresponding data item in the "player attributes" field represents attributes of the participant. The corresponding data item in the "next point" field represents a place to which the participant should move next. Each next point in the participant file 4 is determined from a plurality of selectable points obtained by search in the next point file 5, a selection from the selectable points being made on the basis of the ranks in the control file 6. The determined next point is set in the participant file 4.

<System Configuration>

FIG. 2 shows the configuration of the present information system. The information system is formed by connecting the host computer 1, the ticket issuing terminal 2, and the participant terminals 3 through a network, as shown in FIG. 2.

The host computer 1 has a central processing unit (CPU), a memory, a hard disk, a communication board, etc., which components are not illustrated. Since the computer 1 has a well-known configuration, the description will be omitted.

The host computer 1 has on its memory a reception program 8, a transmission program 9, a participant registration program 10, and a participant control program 11. The host computer 1 functions as a participant control system by executing each of these programs. Also, the host computer 1 has the participant file 4, the next point file 5, and the control file 6 for control of the movements of participants, as described in FIG. 1.

Each of the ticket issuing terminal 2 and the participant terminals 3 is a personal computer to which a card reader unit is connected, a personal digital (data) assistant (PDA), or the like. A card reader unit with which a CPU, a memory and a communication board are integrally combined may be used as each of the ticket issuing terminal 2 and the participant terminals 3.

The ID card 12 in the present information system may be a magnetic card, an IC card (of a contact type or a non-contact type), a synthetic resin card on which digital information is recorded in the form of an arrangement of pits and projections or holes by mechanical systems, a paper card on which digital information is recorded in the form of an arrangement of small holes, or the like.

A simple paper sheet may be used as the ID card 12 by being stamped with certain information in each place. Information stamped on the card may be read with a predetermined reader unit for reading stamped information, e.g., an optical character reader (OCR).

A suitable unit is selected as the card reader unit according to the type of card. A card reader unit whose construction and function are well known can be used for reading from each of the above-described types of card. Therefore, the construction and function of the card reader used in this embodiment will not be described.

<Window Design>

FIG. 3 shows an example of the participant attribute input window 20 of the ticket issuing terminal 2. The participant attribute input window 20 is used by each participant to register his or her attributes and to make a request for issue of a participant ID. The participant attribute input window 20 has a story setting box 21, a search button 22, a number of persons box 23, a player attribute setting section 24, a transmission button, and a cancel button.

In the story setting box 21, the kind of a game in which a participant participates is set. For example, "orienteering" is set. The kind of game can be selected by search started by clicking the search button 22.

In the number of persons box 23, the number of persons in a participant group is set. In the player attributes setting section 24, an attribute of a participant group is set. An attribute set in this section is, for example, one of "family", "couple", "male group", and "female group".

When the transmission button is clicked, the setting contents are transmitted to the host computer 1 and the information items are set in the participant file 4 and the next point file 5 shown in FIGS. 1 and 2. If the cancel button is clicked, the setting contents are abandoned.

FIG. 4 shows an example of the story search window 30 displayed when the search button 22 shown in FIG. 3 is clicked. The story search window 30 has a genre setting section 31, a place request setting section 32, a search result display section 33, an enter button, and a cancel button.

In the genre setting section 31, a participant sets the genre of a game in which he or she wants to participate. For example, a genre selected from "space", "adventure", "fantasy", and "fairy tale" is set. When the participant selects one of these genres, a game using a story relating to the genre is selected.

The place request setting section 32 is titled with "PLACES NOT TO BE MISSED". Examples of places shown in FIG. 4, from which a selection is made in a request, are "merry-go-round", "3D theater", "Ferris wheel", "roller coaster", "go-cart", "bear theater", "monkey train", and "space travel", which are amusement installations in an amusement park.

In the search result display section 33, a list of stories obtained through a search based on genre and place request settings is shown. The search result display section 33 has a "story name" field and a "contents" field. In the "story name" field, the story name obtained through the search is displayed. When a desired story name is clicked with a pointing device (not shown), it is indicated in an emphatic manner (for example, in an area where background color is changed, in an inverse-video area, or in an area bordered with a thickened frame line).

The content of the selected story is displayed in the "contents" field. For example, in the case of orienteering, the field contains story content information "A game in which you search for various places to complete a tour through the places. You'll obtain a fine premium at each point you find out".

When the enter button is clicked, a story selected as a game story is entered and a return to the window shown in FIG. 3 is effected. If the cancel key is clicked, a return to the window shown in FIG. 3 is effected with no change in story setting.

FIG. 5 shows an example of the ticket issue window 40. The ticket issue window 40 is displayed when the transmission button is clicked in the participant attribute input window 20 shown in FIG. 3. The ticket issue window 40 has a message box 41, a ticket issuing button, and a cancel button. In the message box 41, a participant guidance message such as "Ticket issue preparation OK. Please go to first point A2." is displayed.

When a participant clicks the ticket issuing button, a participant ID is set in the ID card 12. If the participant clicks the cancel button, the participant attribute input window 20 shown in FIG. 3 is displayed after clearing the setting contents.

FIG. 6 shows an example of the window 50 on the participant terminal 3 (point terminal) in the case of support for orienteering. In the window 50 on the participant terminal 3, a guide message "Have your card read by the machine . . . " is displayed. When a participant inserts the ID card 12, the participant terminal 3 reads the participant ID from the ID card 12 and transmits it to the host computer 1. The host computer 1 then makes the participant terminal 3 display a guide message on the basis of the attributes of the participant (held in the participant file 4), the conditions related to the participant (held in the next point file 5) and the setting in the control file 6.

The guide message is, for example, "You arrived at target point A2. The next point is B1." In a case where the participant has arrived at a wrong point, an error message such as "This is not point A2. Please search for point A2 again." is displayed. When the participant arrives at the goal point, a completion message such as "You've reached the goal. Congratulations!" is displayed.

<Operation>

FIGS. 7, 8, and 9 show processing in the present information system. As shown in FIG. 7, processing in the information system includes a participant information registration processing (S1) and participant control processing (S2).

FIG. 8 shows details of participant information registration processing. First, in this processing, transmitting step is triggered by a participant operating the ticket issuing terminal 2 to transmit a participation request from the ticket issuing terminal 2 to the host computer 1 (indicated as "participant control system" in FIG. 8) (S10).

The host computer 1 forms an unique participant ID with respect to each participant (or participant group) (S11). The host computer 1 then edits the participant attribute input window 20 (S12) and transmits information on the edited participant attribute input window 20 to the ticket issuing terminal 2 (S13).

The ticket issuing terminal 2 receives the information on the edited participant attribute input window 20 (S14), displays the participant attribute input window 20, and waits for participant's inputting of participant attribute information (S15). When the transmission button as shown in FIG. 3 is clicked after the completion of input of participant attribute information, the ticket issuing terminal 2 transmits the participant attribute information to the host computer 1 (S16).

The host computer 1 receives the participant attribute information (S17) and stores this information (S18).

FIG. 9 shows details of participant control processing. This processing is executed in the host computer 1. In this processing, the host computer 1 receives participant IDs and present attraction information from the participant terminals 3 (point terminals) installed in each of the places in the facility area (S20).

Present attraction information is information on attractions held in the corresponding places. That is, in this embodiment, information on an attraction held in each place is used as information for identification of the place. However, the present invention is not limited this procedure. For example, the host computer 1 may receive, from the participant terminal 3 in each place, participant IDs, the name of the place, an ID for the place, etc.

Next, the host computer 1 makes a determination as to whether the present attraction is the attraction at the goal (S21). If the present attraction is not the attraction at the goal, the host computer 1 refers to the next point file 5 (S22). At this time, the host computer 1 reads information on the attraction at the point which the participant concerned should move next. If attractions in a plurality of places are set in the next point file 5, the next attraction (the next place to go) may be selected according to the ranks in the control file 6.

Next, the host computer 1 refers to the attraction record of the participant concerned in the participant file 4 (S23). The host computer 1 then makes a determination as to whether the attraction recognized in the reference made in step S22 coincides with one of the attractions in the places through which the participant has already passed (the attractions in which the participant has already participated) (S24).

If it is determined that the participant has already participated in the same attraction, the host computer 1 returns control to step S22 to read information on the attraction in the next place. If the participant has never participated in the same attraction, the host computer 1 transmits the information of the attraction as the next attraction to the participant terminal 3 (S25). Thereafter, the host computer 1 returns control to step S20.

<Advantage of Embodiment>

In the information system of this embodiment, as described above, persons who wish to participate in a game in a facility area such as an amusement park or a theme park are registered by the ticket issuing terminal 2 to enable the persons to participate in the game. While a game of a genre suited with preferences of a participant is being executed, the participant can be guided to a place to which the participant wishes to move.

Second Embodiment

Figure 13:
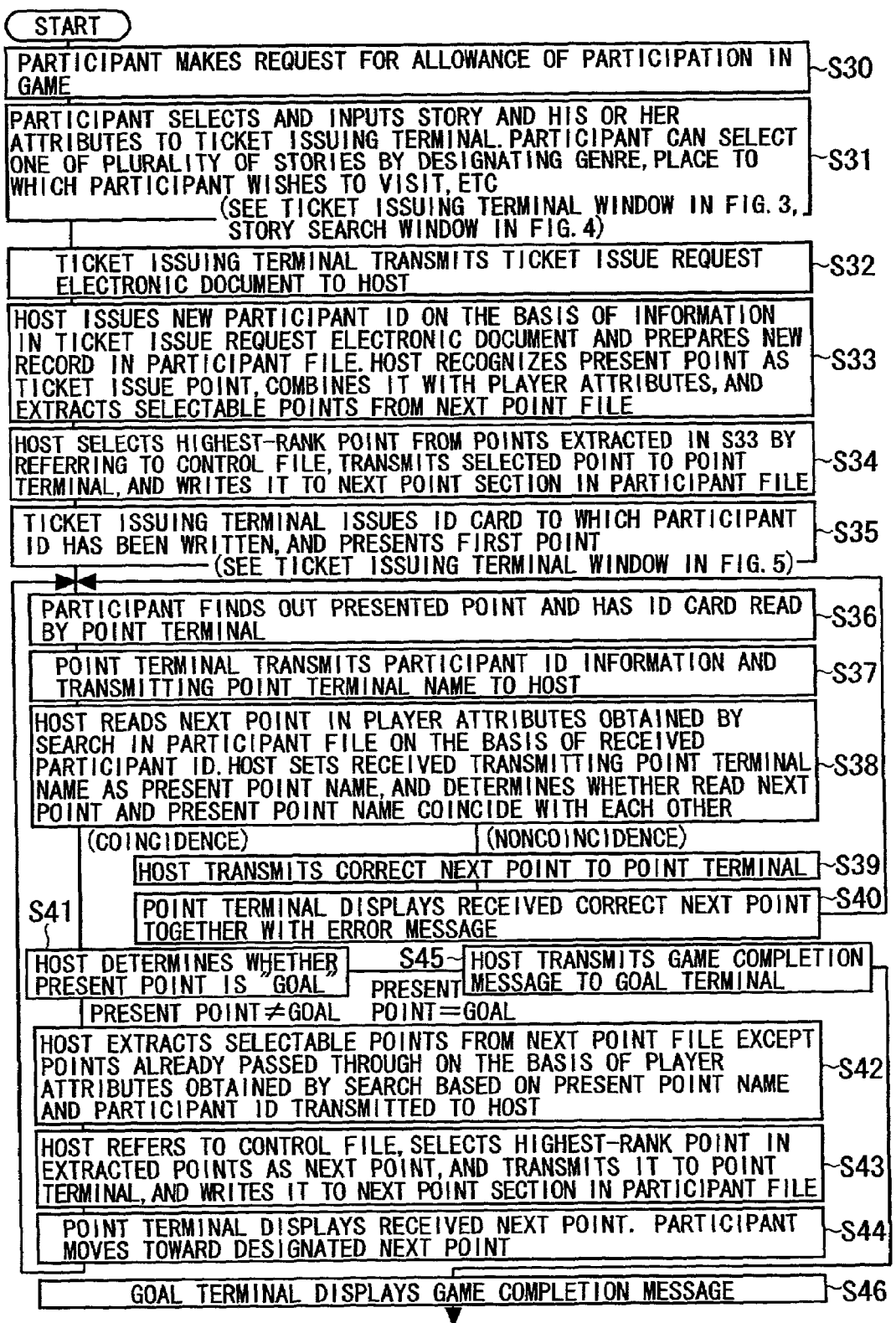
FIG. 13 is a flowchart showing an example of execution of a game.
Figure 15:
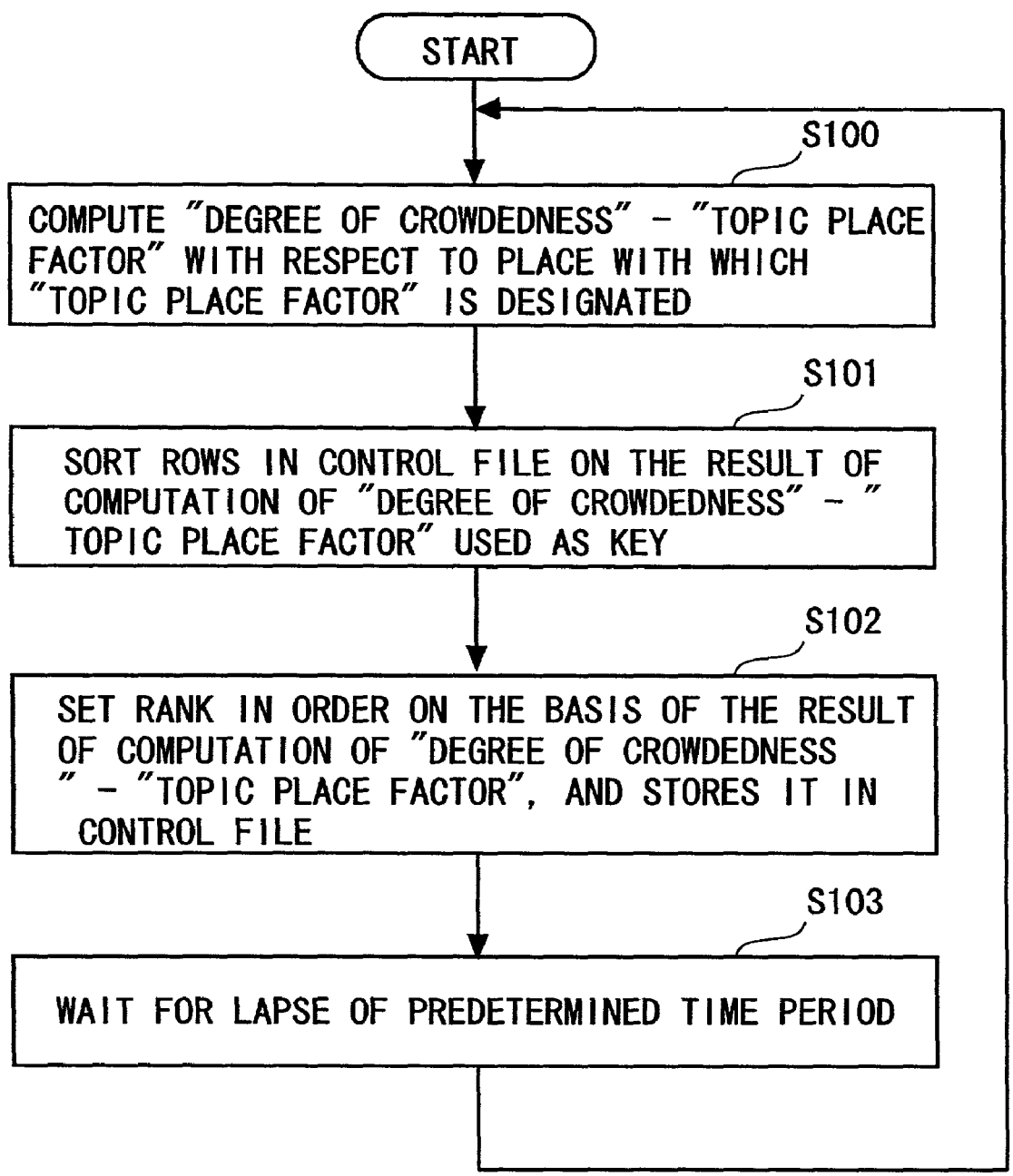
FIG. 15 is a flowchart showing rank determination processing for determining the rank in each point in the control file 6.

A second embodiment of the present invention will be described with reference to FIGS. 10 through 17. FIG. 10 shows an example of data in the control file 6 used in the second embodiment; FIG. 11 shows an example of data in the next point file 5; FIG. 12 shows an example of data in the participant file 4; FIG. 13 shows an example of execution of a game conducted by an information system of the second embodiment; FIG. 14 shows a modification of the control file 6; FIG. 15 shows an example of rank determination processing flow for determining of the ranks of each of the places in the control file 6; FIG. 16 shows a modification of participant file 4; and FIG. 17 shows a modification of the next point file 5.

The information system in the first embodiment has been described as a system for supporting a game executed in a facility area by the host computer 1, the ticket issuing terminal 2 and the participant terminals 3. The second embodiment will be described with respect to an information system in which the degree of crowdedness in each place is computed and selection of places to which participants in a game will move is dynamically controlled so as to mitigate the degree of crowdedness.

In other respects, the configuration and functions are the same as those in the first embodiment. The same components as those in the first embodiment are indicated by the same reference symbols and the description for them will not be repeated. The description of the second embodiment will be made by referring also to FIGS. 1 through 9 if necessary.

<Example of Data>

FIG. 10 shows an example of data in the control file 6 used in this embodiment. In this embodiment, the control file 6 includes the degree of crowdedness in addition to point names and ranks.

The degree of crowdedness is computed on the basis of the cumulative number of participant IDs transmitted from the participant terminal in each place and the capacity of the facility in the place. That is, the cumulative number of participant IDs is regarded as an attendance and the degree of crowdedness is computed as the ratio of the attendance to the capacity.

A limit to the number of participants according to this system may be specially set in the capacity of the facility if necessary, and an attendance per unit time may be used to compute the degree of crowdedness. That is, the attendance may be counted by using a counter unit separately from the cumulative number of participant IDs to compute the degree of crowdedness from the attendance per unit time. More accurate computation of the degree of crowdedness can be performed in this manner. The movement of participants may be controlled under the above-mentioned special limit on the basis of the degree of crowdedness.

In this embodiment, as shown in FIG. 10, the degree of crowdedness is expressed on a scale of 1 to 10, a value closer to 10 representing a higher degree of crowdedness. Also, the ranks of places in this embodiment are changed on the basis of the degree of crowdedness at predetermined time intervals. Therefore, if the time interval is set to a sufficiently small value, the ranks are determined in correspondence with the order of high degree of crowdedness.

FIG. 11 shows an example of data in the next point file 5 in this embodiment. Also in this embodiment, the next point file 5 has a present point field, a player attribute field, and a selectable point field.

"Present points" are the present locations of participants, e.g., the location of the ticket issuing terminal 2 (indicated as "ticket issue" in FIG. 11), each of the places (A1, A2, and so on) in the facility area, a goal point, etc. Numbers of persons, attributes (couple, family, etc.) are shown as "player attributes" in FIG. 11. "Selectable points" are one or more places one of which is selected as a place to which a participant should move next, as are those in the first embodiment.

FIG. 12 shows an example of data in the participant file 4 in this embodiment. Also in this embodiment, the participant file 4 has a participant ID field, a player attribute field, and a next point field.

A "participant ID" is information for uniquely identifying one participant or a group to which the participant belongs. In the participant file 4 in this embodiment, stories, number of persons, attributes, and passed point records are entered as "player attributes". A passed point record is a record of points through which the corresponding participant has passed. The passed point record is used to prevent the participant from passing the same place as one through which the participant has already passed. "Next point" is a place to which a participant should move next.

<Operation>

FIG. 13 shows a procedure of conducting a game under the support from the information system of this embodiment.

Also in this embodiment, a participant transmits a request for allowance of participation in a game through the ticket issuing terminal 2, as in the first embodiment (S30).

Next, the participant selects a story according to his or her preference at the ticket issuing terminal 2 and inputs his or her attributes to the terminal 2. The participant can select one of a plurality of prepared stories by designating a genre, a place to which the participant wishes to visit, etc. (S31). The participant then transmits an electric document containing a ticket issue request from the ticket issuing terminal 2 to the host computer 1 (S32).

The host computer 1 issues a new participant ID on the basis of information in the ticket issue request electronic document and prepares a new record in the participant file 4. The host computer 1 recognizes the present location (present point) of the participant as a ticket issue point, sets it in combination with player attributes, and extracts selectable points from the next point file 5 (S33). Further, the host computer 1 computes the degrees of crowdedness at the points and writes them to the control file 6.

Next, the host computer 1 selects the point having the highest rank from those extracted in step S33 by referring to the control file 6, transmits the selected point to the ticket issuing terminal 2 (referred to as "point terminal" in FIG. 13), and writes the selected point to the next point section in the participant file 4 (S34).

The ticket issuing terminal 2 then issues an ID card 12 to which the participant ID has been written, and also presents the first point (S35). The participant finds out the presented point and has the ID card read by the participant terminal 3 (referred to as "point terminal" in FIG. 13) (S36). The participant terminal 3 transmits the participant ID information and transmitting point terminal name to the host computer 1 (S37).

The host computer 1 reads the next point in the player attributes obtained by search in the participant file 4 on the basis of the received participant ID. The host computer 1 then sets the received transmitting point terminal name as the present point name and makes a determination as to whether the read next point and the present point name coincide with each other (S38). The host computer 1 also computes the degree of crowdedness at the transmitting terminal transmitted from the transmitting terminal, and writes the degree of crowdedness to the control file 6.

If the result of determination in step S38 is that the read next point and the present point name do not coincide with each other, the host computer 1 transmits information designating the correct next point to the participant terminal 3 (S39). The participant terminal 3 then displays the received correct next point together with an error message (S40) whereby the participant is enabled to search for the correct next point in accordance with S36.

If the result of determination in step S38 is that the read next point and the present point name coincide with each other, the host computer 1 makes a determination as to whether the present point is "goal" (S41).

If the present point is "goal", the host computer 1 transmits a game completion message to the goal terminal (S45). The goal terminal then displays the game completion message and terminates the game.

If the present point is not "goal", the host computer 1 extracts selectable points from the next point file 5 except the points already passed through on the basis of player attributes obtained by search based on the present point name and the participant ID transmitted to the host computer 1 (S42).

The host computer 1 refers to the control file 6, selects as the next point the points having the highest rank in the extracted points, and transmits information on this point to the participant terminal 3. The host computer 1 also writes this point to the next point section in the participant file 4 (S43)

The participant terminal 3 displays the next point transmitted from the host computer 1. The participant moves toward the designated next point (S44). Thereafter, the participant again performs the operation shown as step S36 and proceeds with the game under the guidance through the participant terminal 3.

<Advantage of Embodiment>

As described above, the information system in this embodiment computes the degree of crowdedness in each place on the basis of the participants ID input to the participant terminal 3 in the place by participants. The present information system determines the ranks of each of the places in the control file 6 on the basis of the degrees of crowdedness thus computed. The present information system dynamically sets the place to which each participant should move next on the basis of the degrees of crowdedness in the different places, thus controlling the advancement of a game so that the degree of crowdedness is mitigated.

<Examples of Modification>

In the information system of the above-described embodiment, the degree of crowdedness in each place is computed on the basis of the participants ID input to the participant terminal 3 in the place by participants. However, the above-described arrangement of this embodiment is not exclusively used. For example, a counter for counting the number of visitors to the amusement installation in each place may be provided at an entrance gate or the like, and the degree of crowdedness in the place may be computed from information obtained during the advancement of a game (information from participant terminals 3) and the number of visitors obtained from the gate.

In the above-described embodiment, the ranks in the control file 6 are set at predetermined time intervals. The arrangement may alternatively be such that when information (participant ID) is received from each place, the ranks are immediately set on the basis of the degree of crowdedness in the information.

In the above-described embodiment, the rank of each place is set on the basis of the degree of crowdedness alone. Alternatively, the ranks may be set in such a manner as to limit the mitigation in degree of crowdedness in some of the places, e.g., a place where a certain degree of concentration of participants is caused for the purpose of providing a topic for conversation. (Such a place will be referred to as "topic place".) To make such a setting, the rank of a topic place may be set on the basis of a value obtained by subtracting a predetermined factor (referred to as "topic place factor", hereinafter) from the degree of crowdedness.

FIG. 14 shows an example of data in the control file 6 in such a case. As shown in FIG. 14, the control file 6 has a "topic place factor" field and a "degree of crowdedness—topic place factor" field in addition to the point, rank, and crowdedness fields of the control file 6 in the second embodiment.

In the "topic place factor" field, values are set as the factor for underestimation of the degree of crowdedness in each place. In the "degree of crowdedness—topic place factor" field, values each obtained by subtracting the topic place factor from the degree of crowdedness are set. That is, a larger topic place factor may be set with respect to a place where there is a need to attract a larger number of people for the purpose of providing a topic for conversation.

The degree of crowdedness in each place is evaluated through the value of "degree of crowdedness—topic place factor". Thus, while the degree of crowdedness in some of the places is maintained within a certain range, the degree of crowdedness in the other places can be reduced.

FIG. 15 shows an example of such rank setting processing. In this processing, the host computer 1 computes "degree of crowdedness"—"topic place factor" with respect to some of the places with a set "topic place factor" (S100).

Next, the host computer 1 sorts rows in the control file 6 based on the result of computation of "degree of crowdedness"—"topic place factor" used as a key (S101), sets the ranks in the control file 6 in correspondence with the order of the values of "degree of crowdedness"—"topic place factor", and stores the newly set ranks in the control file 6 (S102).

The host computer 1 then waits for a lapse of a predetermined time period (S103). After a lapse of the predetermined time period, the host computer 1 returns control to step S100.

Control may be performed so as to meet a participant's wish to some degree instead of satisfying the above-described condition relating to a topic place, while sacrificing within a certain range the effect of reducing the degree of crowdedness. FIG. 16 shows an example of data in the participant file 4 in such a case.

The participant file 4 additionally has a "wish" field in comparison with the second embodiment (FIG. 12). In the "wish" field, the location of an installation, a restaurant, an attraction or the like which each participant wishes to visit is set. Such a wish may be input through the participant attribute input window 20 shown in FIG. 3.

When the host computer 1 determines the next point for each participant, it may refer to the degrees of crowdedness of the places in the control file 6 and the "wish" field in the participant file 4. With respect to each of the places set in the "wish" field in the participant file 4, the host computer 1 may determine the rank by subtracting a predetermined value from the degree of crowdedness. As a result, game control becomes possible in which a participant's wish to visit a certain place is reflected while the effect of reducing the degree of crowdedness is sacrificed by the amount in the range of the predetermined value.

In the above-described embodiments, the degree of crowdedness is set in the control file 6. However, the present invention is not limited to the above-described arrangement relating to the degree of crowdedness. For example, the degree of crowdedness may be held in the next point file 5. Also, the host computer 1 may determine the next point on the basis of selectable points and the degree of crowdedness in the next point file 5. In such a case, it is not always necessary to use the control file 6.

FIG. 17 shows the composition of the next point file 5 used in such a case. The next point file 5 shown in FIG. 17 has respective fields of a present point, name, story, selectable point, and degree of crowdedness. The name indicates a name of an installation, an attraction or the like in one place. The story represents a kind of game, as in the first and second embodiments.

<<Computer Readable Recording Medium>>

A program for making a computer realize any one of the above-described functions may be recorded on a computer readable recording medium. The program on the recording medium is executed by being read by the computer to perform the function.

The computer readable recording medium indicates a recording medium capable of storing information such as data and a program by electrical, magnetic, optical, mechanical and/or chemical action, and reading from a computer. Examples of such a recording medium which is removable from a computer are a flexible disk, a magneto-optics disk, a compact disk-read only memory (CD-ROM), a compact disk-recordable/rewritable (CD-R/W), a digital versatile disk (DVD), a digital audio tape (DAT), an 8 mm tape, and a memory card.

Examples of the recording medium fixed in a computer are a hard disk and a read only memory (ROM).

<<Data Communication Signal Embodied on Carrier Wave>>

The above-described program may be stored in a hard disk or a memory of the computer and may be distributed to other computers through a communication medium. In such a case, the program is transmitted through the communication medium as a data communication signal embodied on a carrier wave. The computers to which the program is distributed in this manner can perform the above-described function.

The communication medium may be any of cable communication mediums, e.g., metallic cables including coaxial cables and twisted-pair cables, and optical communication cables, and wireless communication mediums, e.g., satellite communications and ground wave wireless communications.

The carrier comprises electromagnetic waves or light for modulating the data communication signal. The carrier may be a dc signal. In such a case, the data communication signal has a base band waveform with no carrier. Therefore the data communication signal realized on the carrier may be either a modulated broadband signal or an unmodulated baseband signal (corresponding to a case where a carrier of a zero voltage dc signal is used).

What is claimed is:

1. A facility management support apparatus which manages visitors in a facility area, the apparatus comprising:

a place information storage unit storing the degree of crowdedness in each of places in the facility area;

a receiving unit receiving, from a terminal, information which enables identification of the location of the terminal;

an extraction unit extracting one of the places to which one of the visitors should move on the basis of the degree of crowdedness and the location of the terminal; and a transmission unit transmitting, to the terminal, information which enables identification of the place to which the visitor should move;

further including a story storage unit storing information on the places and a story by relating the places and the story to each other, wherein the extraction unit extracts one of the places to which the visitor should move on the basis of the location of the terminal and the story.

2. A facility management support apparatus according to claim 1, wherein the story is selected on the basis of story selection information received from the visitor in advance.

3. A computer readable recording medium upon which a program, for use by a computer, is recorded for performing the following steps for managing visitors in a facility area:

storing the degree of crowdedness in each of places in the facility area in a place information storage unit;

receiving, from a terminal to a receiving unit, information which enables identification of the location of the terminal;

extracting, via an extraction unit, one of the places to which one of the visitors should move on the basis of the degree of crowdedness and the location of the terminal;

transmitting to the terminal, via a transmission unit, information which enables identification of the place to which the visitor should move; and storing information in a story storage unit on the places and a story by relating the places and the story to each other, wherein during the extracting step, the extraction unit extracts one of the places to which the visitor should move on the basis of the location of the terminal and the story.

4. The computer readable recording medium according to claim 3, wherein the story is selected on the basis of story selection information received from the visitor in advance.

5. A method for managing visitors in a facility area, the method comprising:

storing the degree of crowdedness in each of places in the facility area in a place information storage unit;

receiving, from a terminal to a receiving unit, information which enables identification of the location of the terminal;

extracting, via an extraction unit, one of the places to which one of the visitors should move on the basis of the degree of crowdedness and the location of the terminal;

transmitting to the terminal, via a transmission unit, information which enables identification of the place to which the visitor should move; and storing information in a story storage unit on the places and a story by relating the places and the story to each other, wherein during the extracting step, the extraction unit extracts one of the places to which the visitor should move on the basis of the location of the terminal and the story.

6. The method according to claim 5, wherein the story is selected on the basis of story selection information received from the visitor in advance.

* * * * *